Feb. 17, 1931.　　　　M. E. LUTHER　　　　1,793,233
HEADLIGHT
Filed Oct. 30, 1929　　　2 Sheets-Sheet 1
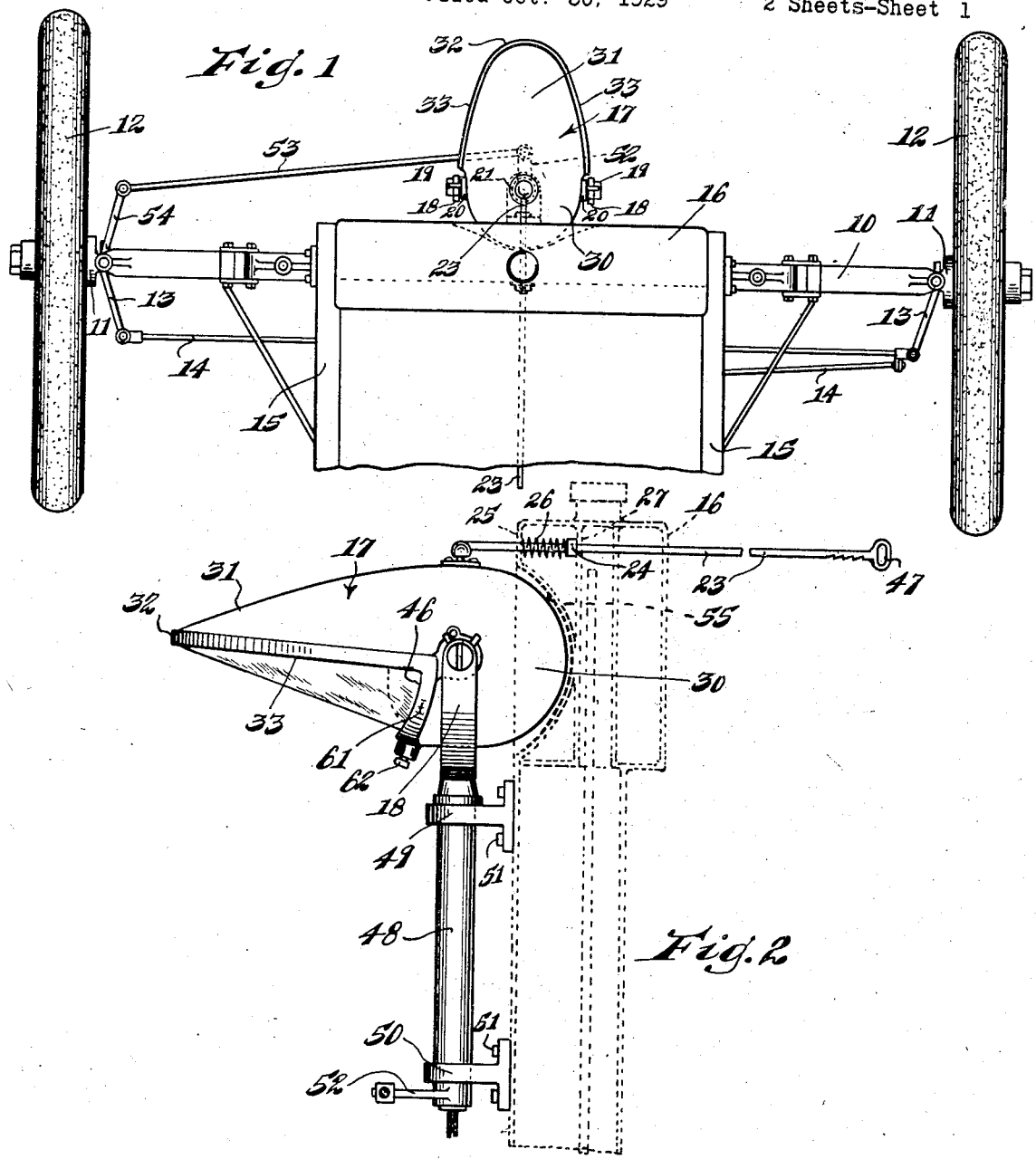
Witnesses:
C. E. Wessels
A. E. Matson
Inventor:
Melvin E. Luther;
By Joshua R. H. Potts
his Attorney.

Feb. 17, 1931.　　M. E. LUTHER　　1,793,233
HEADLIGHT
Filed Oct. 30, 1929　　2 Sheets-Sheet 2
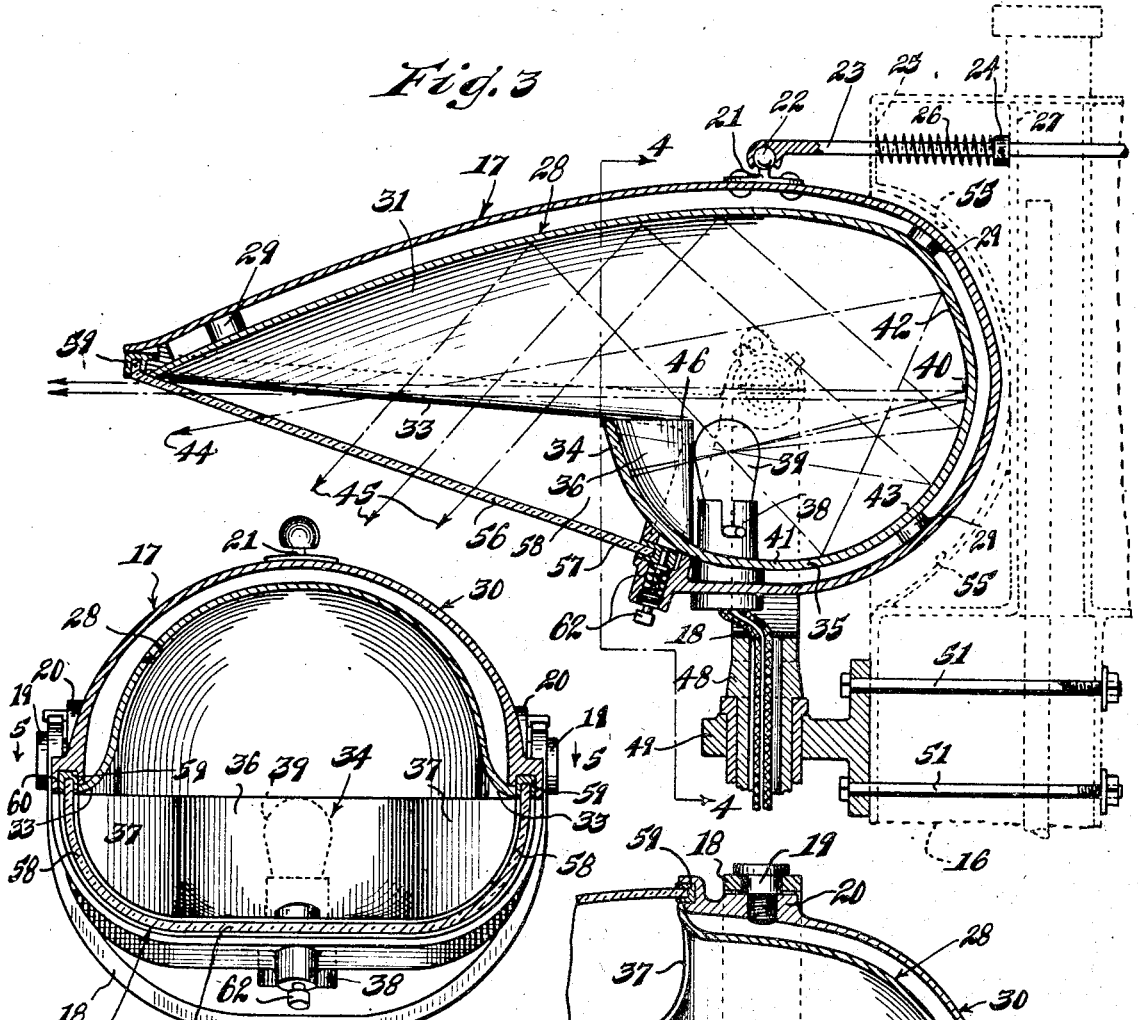
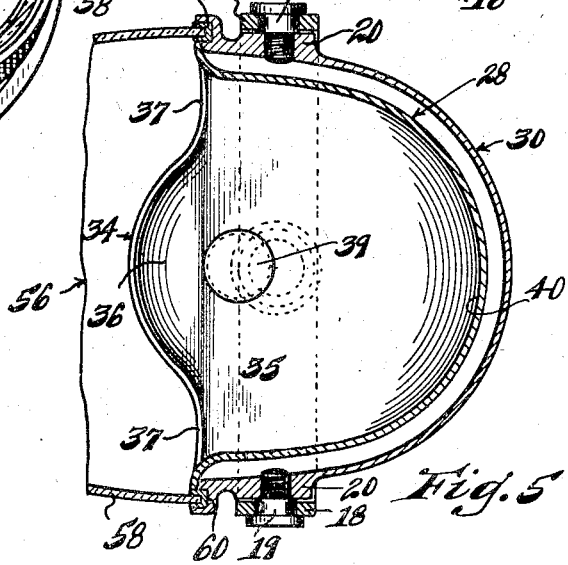
Witnesses:
C. E. Wessels
O. E. Matsen
Inventor:
Melvin E. Luther;
By Joshua R. H. Potts
his Attorney.

Patented Feb. 17, 1931

1,793,233

UNITED STATES PATENT OFFICE

MELVIN E. LUTHER, OF CHICAGO, ILLINOIS

HEADLIGHT

Application filed October 30, 1929. Serial No. 403,434.

This invention relates to headlights for vehicles, and more particularly to a light of this character for use on automobiles and the like.

The invention has for its principal object to produce an improved headlight having provision for diffusion of its rays laterally within close range of the lamp so as to illuminate the lower front portion of the vehicle the full width thereof and to concentrate and intensify the rays of light directly forward to a considerable distance ahead of the vehicle and at the same time avoid the objectionable glare usually incident to the ordinary headlight. Another object of the invention is to produce a novel lamp structure with peculiarly cooperating baffle and reflecting portions whereby a single lighting device may be located in the middle and in front of the car instead of using two lights located respectively at opposite sides of the car, as is now the general custom. Other objects and advantages to be attained will more fully appear in the following description.

The invention consists in the novel construction and arrangement and in the parts and combinations and arrangements of parts as hereinafter described and pointed out with particularity in the appended claims.

In the accompanying drawings, illustrating a practical adaptation of the invention,—

Fig. 1 is a fragmentary plan view of the front portion of an automobile, illustrating the application of the headlight thereto;

Fig. 2 is a side elevation, the headlight and its directly supporting and operating members shown in full lines and the radiator shell of the automobile being indicated in dotted lines;

Fig. 3 is a longitudinal section, on an enlarged scale, through the headlight;

Fig. 4 is a section on the line 4—4 of Fig. 3; and

Fig. 5 is a section substantially on the horizontal plane containing the longitudinal axis of the device as shown in Fig. 3 looking downwardly.

Referring now to the drawings, the numeral 10 designates the usual front axle of an ordinary automobile, at the ends of which are the usual steering knuckles 11 on which the wheels 12 are mounted. Extending rearward from the knuckles 11 are the lever arms 13 which are connected by the cross rod 14 of the steering mechanism. The chassis frame, designated by the numeral 15, has the usual radiator shell 16 mounted on a forward portion thereof. All of the foregoing described parts are illustrated conventionally and without any particular detail except as to certain features incidental to the location and operation of the headlight, as will be later more fully set forth.

The headlight of the present invention comprises a shell or housing which is ovate in general form. As shown, this housing preferably comprises an outer casing 17 which is made of metal or other suitable material possessing the necessary qualties for strength and durability, said casing being hinged to swing about a horizontal axis on a supporting yoke 18, the arms of said yoke having apertures therein for the reception of shouldered studs 19, the screw-threaded end portions of which latter are secured in correspondingly threaded apertures provided therefor in embossed portions 20 on opposite sides of said casing 17. At the top of said casing is a bracket member 21 which has a ball and socket conection 22 with a reciprocatory supporting and controlling rod 23, which latter, as shown, is extended through the upper portion of the radiator shell above the normal water level thereof, whereby to be supported and guided in its reciprocatory movement. As shown, this rod 23 is provided with a shoulder or collar 24, between which and the front wall 25 of the radiator shell is interposed a spring 26, said spring normally pressing the collar 24 against the inner wall 27 of the radiator shell, or a special stop which may obviously be provided therefor within the shell. By this arrangement the casing 17 is yieldably supported in normal position and by pressing the rod 23 forwardly the casing 17 is, obviously, tilted about the axis of its swivel support afforded by the studs 19 and cooperating end portions of the yoke 18.

Within the casing 17 is a lining 28 which follows the general contour of the casing 17 and is preferably spaced therefrom, it being supported at intervals upon lugs or other suitable spacing elements 29. This lining is either constructed of a suitable metal, which will take a high polish, or is otherwise prepared for the reflection of light.

The rear portion of the lining 28, and, of course, the adjacent surrounding portion of the outer casing 17, are rounded, as at 30, and are more or less of general spherical form except as to certain peculiarly shaped portions thereof, which will be described in detail later on. The forward upper portion 31 of the lining 28 and casing 17, which merges with the rounded rear portion 30, tapers or converges towards the front end of the device, which is rounded, as indicated at 32 in Fig. 1 of the drawings.

The forward portions of the lining 28 and casing 17 are cut away so that their marginal portions, which coincide, extend nearly horizontally from front to rear and, preferably, slightly at a downward inclination towards the rear, as at 33, the rear end portions of said margins being in a plane coincident with the top edge of a baffle wall 34, which latter is a continuation of or merges with the under wall 35 of the substantially spherical rear portion of the lining 28. The central portion 36 of this baffle wall 34 is concavo-convex, the lateral end portions 37 thereof being straight and substantially perpendicular to the undercut forward portions 33 of said lining. In the normal position of the device, as shown more clearly in Fig. 3 of the drawings, the top edge of the baffle wall 34 is in a plane slightly below that of the extreme outer end portion of the lining 28, and fitted in a socket 38 provided therefor in the chamber formed by the wall 34 and adjacent wall portions of the lining 28, is an electric light bulb 39, which as a whole or at least whose filament is located below the horizontal plane of the upper edge of said wall 34.

The inner faces of said baffle wall 34, including its concavo-convex central portion 36 and the lateral wings or side portions 37, are polished or otherwise prepared as reflecting surfaces. By this arrangement there are no direct rays emanating from the light bulb 39 through the open portion of the lining 28 and outer casing 17. However, the concavo-convex portion 36 of the baffle wall 34 concentrates and directs the rays of light from the bulb to approximately the middle point 40 of the reflecting surface at the rear of the lining 28, whence said rays are concentrated and directed strongly through the space between the upper edge of said baffle wall 34 and the outer portions of the undercut margins 33 of the lining and casing, said rays being directed to a considerable distance forwardly but at a relatively low elevation so as not to project a glare into the eyes of the driver of an approaching car. While the stronger rays are thus concentrated and projected, there is a relatively flattened reflecting surface 41 in the lower rear portion of the lining 28 which is correlated to another flattened surface 42 in the rear upper portion of said lining, and these two flattened surfaces in conjunction with the more concaved intermediate portion 43 cause a reflex diffusion along the direction of the lines tipped by the arrowheads 44 and 45, thus directing the light towards the ground in the closer region of the vehicle on which the device is mounted.

Sufficient light to illuminate the lower front portion of the vehicle on which the device is mounted is permitted to radiate laterally under the undercut marginal portions 33 of the lining and outer casing from the opposite corner portions 46, where said lateral portions 37 of the baffle wall 34 join said undercut marginal portions 33, this part being relatively closer to the front face of the radiator shell and thereby directing the light across the entire lower front portion of the machine for illuminating the fenders and front wheels so that the same are visible to the driver of an approaching car at a considerable distance away. The side portions 37 of the baffle wall 34 being located in the transverse plane where the lining 28 and casing 17 are of widest transverse dimension and said shell tapering therefrom towards the forward end, the rays of light are concentrated and converged in a forward direction, thereby illuminating the roadway, making it easier for the driver of the car on which the device is mounted to observe the condition of the roadway and at the same time the driver of the approaching car is relieved of the usual glare and can readily discern the proportions of the vehicle as he approaches it, which thereby enables him to judge the necessary clearing distance in passing the vehicle.

Normally the entire device of the present invention is set so as to direct the centralized longitudinal rays to a considerable distance ahead of the car, yet, owing to the forward portion of the outer casing 17 and lining 28 having a hooded effect so as to avoid the usual objectionable glare, the device may be tilted on its horizontal pivotal axis by the driver grasping a handle portion 47 on the controlling rod 23, said handle being obviously located within convenient reach of the driver, and thereby pushing the rod forwardly so as to correspondingly tip the light and thereby direct the rays in closer range to the front of the vehicle.

It is further preferable to mount the device of the present invention so as to turn it about a vertical axis and provide for its actuation with dirigible effect. In other words, it is preferable to provide for turning the light about a vertical axis simultaneously with the change of direction of the car. For this purpose the yoke 18 has its stem portion 48 journaled in upper and lower bearing brackets 49 and 50, respectively, said bearing brackets being supported, as at 51, to the front of the radiator shell (see Figs. 2 and 3 of the drawings), or the swivel mounting of the device may be accomplished in any other desirable manner. As shown, the stem 48 is provided at its lower end with a forwardly projecting lever arm 52 which is hingedly connected at its outer end to one end of a connecting rod 53, which latter is connected at its opposite end to a lever arm 54 projecting forwardly from one of the steering knuckles of the front axle 10. By this arrangement the supporting stem 48 of the device is turned correspondingly as the front wheels 12 of the car are turned either to the right or to the left, as the case may be, thereby directing the forwardly projected rays of light from the device in the direction the car is traveling at all times.

The device may be mounted at any convenient distance in front of the usual radiator shell, but, for compactness, in some cases the adjacent portion of the radiator shell may be recessed, as indicated at 55 in Figs. 1, 2 and 3 of the drawings, and the rear portion of the casing 17 located therein, but with sufficient clearance, of course, to permit the movement of the casing about the horizontal and vertical axes, as hereinbefore described.

The opening in the under side of the outer casing 17, through which the reflected rays of light are transmitted from the device and which is produced by the undercutting of the forward portion of the shell, may be closed in any suitable manner by a transparent, translucent or semi-transparent closure, preferably glass. As shown, this closure, designated by the numeral 56, is dished or concavo-convex in cross-section, the forward portion thereof being entirely curved transversely, but the rear portion being flattened at the middle, as at 57, and curved at its sides, as at 58. This closure is provided more particularly to protect the interior of the device from dust and the elements of the atmosphere, and, as shown more clearly in Figs. 3, 4 and 5 of the drawings, its marginal portions are provided with a flanged beading 59 which is slidably fitted in grooves 60 provided therefor in the front and side marginal portions 33 and the marginal portion 61 of the outer casing 17 in the region of the transverse baffle wall 34. This closure is readily slid into place and it is releasably held in position by a suitable spring-actuated bolt 62. However, instead of providing the closure 56 of the shape shown in the drawings, it may, in some cases, be merely a flat plate and secured to the front and side marginal portions 33 and fitted to the upper edge portion of the baffle wall 34. This modification being obvious, it is deemed unnecessary to illustrate the same in detail in the accompanying drawings.

Obviously, many changes may be made in the construction of the device and in the operation thereof without in the least departing from the spirit and scope of the invention as defined by the appended claims. The invention, therefore, is not limited to the specific construction and arrangement shown in the accompanying drawings.

Having thus described my invention, what I claim as new and desire to secure by Letters Patent is:

1. A headlight of the character described, comprising an ovate shell whose longitudinal axis is disposed in substantially a horizontal plane, the forward portion of said shell being undercut and providing an opening for the transmission of the light from said shell, the larger end portion of said shell being rearward and constituting a semi-spherical chamber and the forward portion of said shell constituting a tapering dome-like hood, said shell having a transverse baffle wall merging at its lower portion with the adjacent wall of said semi-spherical chamber, and its upper marginal portion being in substantially the same horizontal plane as the side and forward marginal portions of said hood portion of the shell, and a lighting element located medially in said semi-spherical chamber and adjacent to said baffle wall, said lighting element being located so that its rays are obstructed by said baffle wall against direct radiation from the shell, the inner surface of said baffle wall and the interior of said chamber and hood portion being reflectively surfaced whereby to concentrate and intensify the rays of light from said lighting element in a longitudinal direction and in a restricted path, and also diffuse the light downwardly and laterally, the projection of all the rays being below the plane of the side and forward margins of the forwardly overhanging hood.

2. A headlight of the character described, comprising a shell in the form of a tapered oval, whose longitudinal axis is disposed in substantially a horizontal plane, the forward portion of said shell being undercut from the point of its forward extremity along the horizontal plane of its longitudinal axis for substantially two-thirds of its length to provide an opening for the transmission of light from the shell, the rear of said shell constituting a semi-spherical chamber, a transverse baffle wall merging at its lower portion with the wall of the semi-spherical chamber, and its upper marginal portion being in substantially the same horizontal plane as the side and forward marginal portions of the shell, a lighting element in the chamber adjacent to the baffle wall but beneath the upper horizontal plane of the baffle wall, the inner surfaces of the chamber and hood being reflectively surfaced whereby direct radiation is eliminated and the rays are reflected downwardly in a longitudinal and lateral direction.

3. A headlight of the character described, comprising an ovate shell whose longitudinal axis is disposed in substantially a horizontal plane, the forward portion of said shell being undercut from the point of its forward extremity along the horizontal plane of its longitudinal axis for substantially two-thirds its length to provide an opening for the transmission of light from the shell, the larger end of said shell being rearward and constituting a semi-spherical chamber, and the said forward portion of said shell constituting a tapered dome-like hood, a transverse baffle wall merging at its lower portion with the wall of the semi-spherical chamber, and its upper marginal portion being in substantially the same horizontal plane as the side and forward marginal portions of the hood portion of the shell, a lighting element in the semi-spherical chamber and adjacent to the baffle wall but beneath the upper horizontal portion of the baffle wall, the inner surface of said baffle wall and the interior of said chamber and hood portion being reflectively surfaced, said undercutting and reflecting structure thereby concentrating and intensifying the rays of light from said lighting element in a longitudinal direction and also diffusing the light downwardly and laterally.

In testimony whereof I have signed my name to this specification.

MELVIN E. LUTHER.